United States Patent
Shoji

(10) Patent No.: US 7,535,612 B2
(45) Date of Patent: May 19, 2009

(54) OPTICAL SCANNER AND IMAGE FORMING APPARATUS INCLUDING SAME

(75) Inventor: Katsunori Shoji, Chigasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/216,245

(22) Filed: Jul. 1, 2008

(65) Prior Publication Data
US 2009/0009840 A1    Jan. 8, 2009

(30) Foreign Application Priority Data
Jul. 2, 2007    (JP) .............................. 2007-174084

(51) Int. Cl.
*G02B 26/08*    (2006.01)
*B41J 15/14*    (2006.01)

(52) U.S. Cl. .................. 359/204; 359/201; 347/242; 347/257

(58) Field of Classification Search .................. None
See application file for complete search history.

(56) References Cited

U.S. PATENT DOCUMENTS

| | | | |
|---|---|---|---|
| 6,791,595 B1 * | 9/2004 | Rauch | 347/242 |
| 7,031,039 B2 * | 4/2006 | Takayama | 359/204 |
| 2007/0070173 A1 | 3/2007 | Yamakawa et al. | |
| 2007/0122192 A1 | 5/2007 | Yamakawa et al. | |
| 2007/0134023 A1 | 6/2007 | Shoji et al. | |
| 2007/0139745 A1 | 6/2007 | Shoji et al. | |
| 2007/0165099 A1 | 7/2007 | Yoshizawa et al. | |
| 2007/0252077 A1 | 11/2007 | Shoji et al. | |

FOREIGN PATENT DOCUMENTS

| | | |
|---|---|---|
| JP | 2003-182146 | 7/2003 |
| JP | 2005-049468 | 2/2005 |
| JP | 3913979 | 2/2007 |

OTHER PUBLICATIONS

Abstract of JP 2002-182145 published Jun. 26, 2002.

* cited by examiner

*Primary Examiner*—James Phan
(74) *Attorney, Agent, or Firm*—Harness, Dickey & Pierce, P.L.C.

(57) ABSTRACT

An optical scanner scans a plurality of objects respectively with optical beams and includes a deflector assembly including at least one deflecting unit that deflects the optical beams in a main scanning direction and a plurality of reflection optical systems each including a plurality of reflection mirrors to reflect one of the optical beams and a curvature adjustment unit. The curvature adjustment unit forcibly curves one of the reflection mirrors in a direction opposite the main scanning direction with a holder structure, pushes the reflection mirror in a direction opposite the direction of the forcible curve with a pressure unit, and adjusts a direction and an amount of curvature of a main scanning line by adjusting an amount that the pressure unit deforms the reflection mirror. The main scanning lines on the plurality of objects are curved in a similar direction due to the forcible curve of the reflection mirror.

11 Claims, 9 Drawing Sheets

OPTICAL SCANNER AND IMAGE FORMING APPARATUS INCLUDING SAME

CROSS-REFERENCE TO RELATED APPLICATIONS

This patent specification claims priority from Japanese Patent Application No. 2007-174084, filed on Jul. 2, 2007 in the Japan Patent Office, the entire contents of which are hereby incorporated by reference herein.

BACKGROUND OF THE INVENTION

1. Field of the Invention

The present invention generally relates to an optical scanner and an image forming apparatus, such as a laser printer, a digital copier, a laser facsimile machine, etc., including the optical scanner.

2. Discussion of the Background Art

Tandem image forming apparatuses that form multicolor images are now widely used. Such tandem image forming apparatus includes multiple image carriers, such as photoreceptors, and an optical scanner that directs an optical scanning light (writing light) onto each image carrier so as to form an electrostatic latent image thereon.

On the image carriers, different color images are formed, for example, by developing such electrostatic latent images with different color toners, and these images are transferred from the image carriers and superimposed one on another onto a transfer medium, such as a sheet of paper. Thus, a multicolor image is formed by superimposing different single color images one on another.

In such image forming apparatuses, if relative positions of the images formed on the image carriers are not aligned with each other, the final multicolor image will have color deviation, which means that the superimposed single color images are not aligned with each other in the multicolor image.

Causes of such color deviation include curvature of a scanning line on the image carrier in a main scanning direction, which is hereinafter referred to as a main scanning line. More specifically, the optical scanner is typically distorted slightly due to shape and assembly error of its components, such as optical parts and holders. Further, a motor generates heat during optical scanning, which tends to thermally deform those optical scanner components. Such shape error, assembly error, and thermal deformation of the optical scanner components can cause curvature of the main scanning line.

Such curvature of the main scanning line is further described below with reference to FIG. 1.

FIG. 1 illustrates a drum-shaped photoreceptor serving as an image carrier and main scanning lines directed on a surface thereof, an ideal main scanning line La and curved main scanning lines Lb and Lc.

A center portion of the curved main scanning line Lb projects downstream in a sub-scanning direction, which is a direction in which the surface of the photoreceptor moves. By contrast, a portion of the curved main scanning line Lc projects upstream in the sub-scanning direction. The direction in which the main scanning line curves is unique to each optical scanner because such curvature is caused by a combination of shape error, assembly error, and thermal deformation of the optical scanner components.

Further, the main scanning line on each of the multiple photoreceptors used in the tandem image forming apparatus curves in a direction unique to each image forming apparatus.

If the main scanning lines on the multiple photoreceptors curve differently from each other, relative positions of the respective color images might differ from each other significantly, and accordingly a resultant image is disturbed by color deviation. In order to reduce the color deviation in multicolor images, it is necessary to correct the curvature of the main scanning lines on the respective photoreceptors even when those main scanning lines curve differently from each other.

SUMMARY OF THE INVENTION

In view of the foregoing, in one illustrative embodiment of the present invention, an optical scanner to scan a plurality of objects respectively with optical beams emitted from an optical beam emitter includes a deflector assembly and a plurality of reflection optical systems. The deflector assembly includes at least one deflecting unit that deflects the optical beams in a main scanning direction. Each of the plurality of reflection optical systems includes a plurality of reflection mirrors to reflect one of the optical beams and a curvature adjustment unit. The curvature adjustment unit includes a holder structure to forcibly curve one of the reflection mirrors in a direction opposite the main scanning direction and a pressure unit to push the reflection mirror in a direction opposite the direction of the forcible curve. The curvature adjustment unit adjusts a direction and an amount of curvature of a main scanning line on the object to be scanned by adjusting an amount that the pressure unit deforms the reflection mirror. Each of the main scanning lines on the plurality of objects is curved in a similar direction due to the forcible curve of the reflection mirror formed by the holder structure.

In another illustrative embodiment of the present invention, an optical scanner to scan a plurality of objects respectively with optical beams emitted from an optical beam emitter including a deflector assembly and a plurality of reflection optical systems. The deflector assembly includes at least one deflecting unit that respectively deflects the optical beams in a main scanning direction. Each of the plurality of reflection optical systems includes a plurality of reflection mirrors to reflect one of the optical beams, and an even number of curvature adjustment units. Each of the curvature adjustment units includes a holder structure to forcibly curve one of the plurality of reflection mirrors in a direction opposite the main scanning direction and a pressure unit to push the reflection mirror in a direction opposite the direction of the forcible curve. The curvature adjustment unit adjusts a direction and an amount of curvature of a main scanning line on the object by adjusting an amount that the pressure unit deforms the reflection mirror. In each of the plurality of reflection optical systems, a first half of the curvature adjustment units and a second half thereof curve the main scanning line in directions opposite to each other by respectively curving the reflection mirrors forcibly with the holder structures.

Yet in another illustrative embodiment of the present invention, an image forming apparatus includes a plurality of image carriers on each of which an electrostatic latent image is formed, the optical scanner described above, a plurality of developing units each configured to develop the electrostatic latent image formed on one of the image carriers, and a plurality of transferers each configured to transfer the developed image on one of the image carriers to a transfer member.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
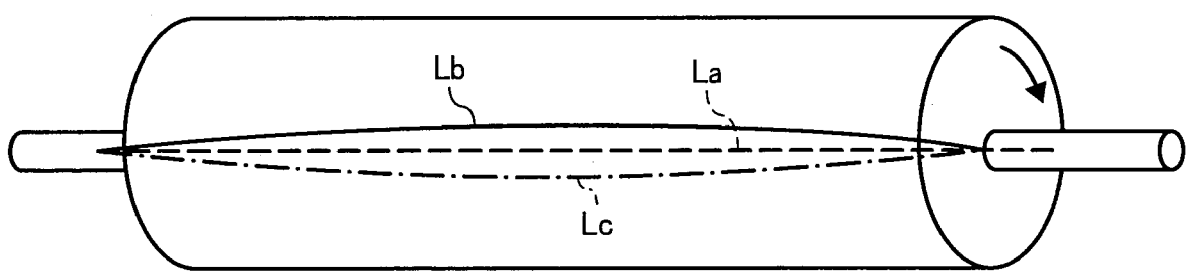
FIG. 1 illustrates an example of main scanning lines on a photoreceptor.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Figure 2:
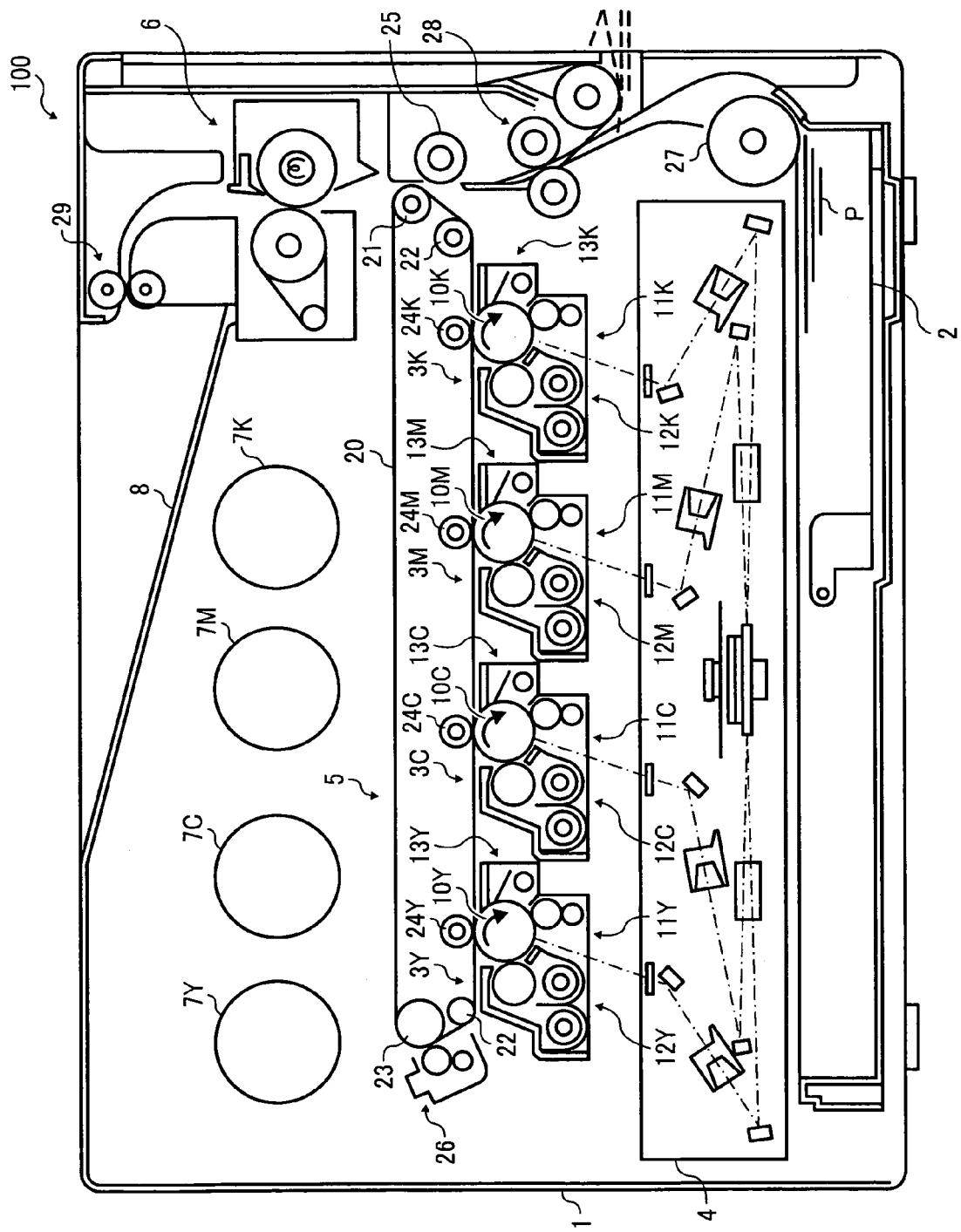
FIG. 2 illustrates a schematic configuration of an image forming apparatus according to an illustrative embodiment of the present invention.

Referring now to the drawings, wherein like reference numerals designate identical or corresponding parts throughout the several views thereof, and particularly to FIG. 2, an electronographic color image forming apparatus 100 according to an illustrative embodiment of the present invention is described.

Referring to FIG. 2, the image forming apparatus 100 is a laser color printer in the present embodiment, and includes a housing 1 and a sheet cassette 2 that is removable from the housing 1 and contains sheets P (recording media). In a center portion of the housing 1, image forming stations 3Y, 3C, 3M, and 3K for forming yellow, cyan, magenta, and black toner images on drum-shaped photoreceptors 10Y, 10C, 10M, and 10K serving as image carriers, respectively, are provided.

It is to be noted that reference characters Y, M, C, and K show yellow, magenta, cyan, and black, respectively, and may be omitted in the description below when color discrimination is not necessary.

Each of the photoreceptors 10Y, 10C, 10M, and 10K includes a cylindrical aluminum base having a diameter of about 40 mm and a photosensitive layer provided on a surface of the base. Examples of a material of the photosensitive layer include an organic photoconductor (OPC).

In each of the image forming stations 3Y, 3C, 3M, and 3K, a charger 11 to charge a surface of the photoreceptor 10, a developing unit 12 to develop an electrostatic latent image formed thereon, and a cleaner 13 to clean the surface thereof are provided around the photoreceptor 10.

In FIG. 2, below the image forming stations 3Y, 3C, 3M, and 3K, an optical writing unit 4 serving as an optical scanner that optically scans the surfaces of the photoreceptors 10Y, 10C, 10M, and 10K with writing lights emitted from a laser diode serving as an optical beam emitter, not shown, is provided. Above the image forming stations 3Y, 3C, 3M, and 3K, an intermediate transfer unit 5 including an intermediate transfer belt 20 is provided. The intermediate transfer belt 20 serves as a transfer member onto which the toner images formed on the photoreceptors 10Y, 10C, 10M, and 10K are transferred.

As shown in FIG. 2, the image forming apparatus 100 further includes a fixer 6 to fix a toner image on the sheet P, located above the intermediate transfer unit 5, and toner bottles 7Y, 7C, 7M, and 7K containing yellow, cyan, magenta, and black toners, respectively, located in an upper portion of the housing 1. These toner bottles 7Y, 7C, 7M, and 7K can be removed and installed by opening a discharge tray 8 provided in the upper portion of the housing 1.

The intermediate transfer belt 20 is looped around a driving roller 21, a tension roller 22, and a driven roller 23 and rotated counterclockwise in FIG. 2. The intermediate transfer unit 5 further includes primary transfer rollers 24Y, 24C, 24M, and 24K, a secondary transfer roller 25, and a belt cleaner 26.

In a primary transfer process, the primary transfer rollers 24Y, 24C, 24M, and 24K transfer the toner images formed on the photoreceptors 10Y, 10C, 10M, and 10K, respectively, onto the intermediate transfer belt 20, and these images are superimposed one on another thereon. Then, the secondary transfer roller 25 transfers the superimposed toner image from the intermediate transfer belt 20 onto the sheet P in a secondary transfer process. After the secondary transfer process, the belt cleaner 26 cleans the intermediate transfer belt 20.

The image forming apparatus 100 further includes a feed roller 27 provided close to the sheet cassette 2, a pair of registration rollers 28, a pair of discharge rollers 29, and a controller to control respective portions thereof.

Figure 3:
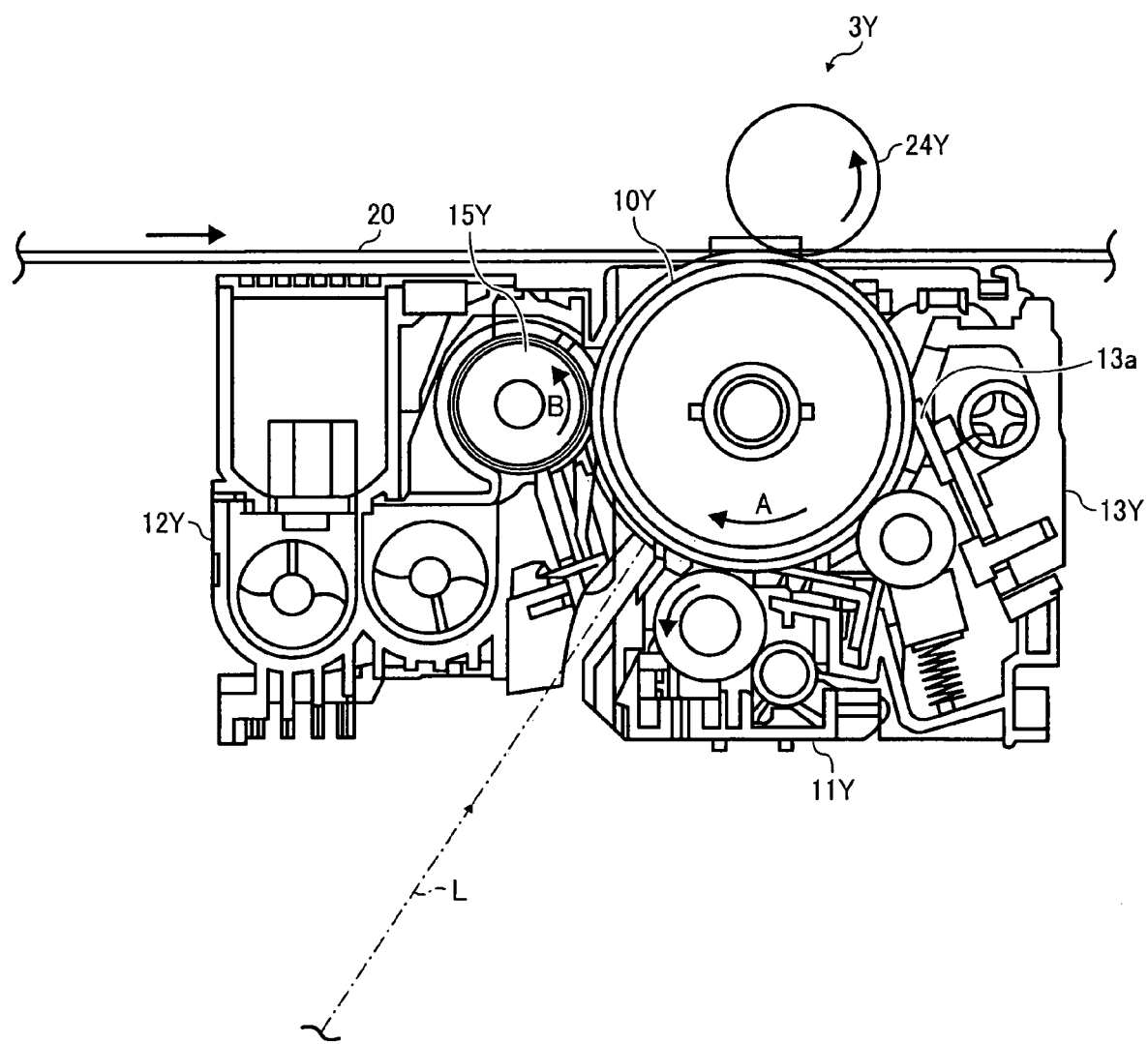
FIG. 3 illustrates a schematic configuration of a yellow image forming station included in the image forming apparatus shown in FIG. 2.

FIG. 3 illustrates a schematic configuration of the image forming station 3Y. It is to be noted that the image forming stations 3C, 3M, and 3K has a configuration similar to that of the image forming station 3Y, and thus descriptions thereof omitted.

Processes to make a color image with the above-described image forming apparatus 100 are described below with reference to FIGS. 2 and 3.

Firstly, in the image forming station 3Y, the charger 11Y charges uniformly the surface of the photoreceptor 10Y, and then the optical writing unit 4 scans the surface of the photoreceptor 10Y with a writing light L according to image information, forming an electrostatic latent image thereon. The developing unit 20 develops the electrostatic latent image with yellow toner carried on a developing roller 15Y, shown in FIG. 3, of the developing unit 12, thus forming a yellow toner image on the photoreceptor 10Y. Similarly, the image forming stations 3C, 3M, and 3K form cyan, magenta, and black toner images on the photoreceptors 10C, 10M, and 10K, respectively.

Then, the primary transfer rollers 24Y, 24C, 24M, and 24K transfer the yellow, cyan, magenta, and black toner images from the photoreceptors 10Y, 10C, 10M, and 10K, respectively, and superimpose these images one on another on the intermediate transfer belt 20 that is rotating counterclockwise in FIG. 2.

Timing of image forming operations described above is different for each color so that the respective color toner images are superimposed one on another in an identical or similar portion of the intermediate transfer belt 20. More specifically, the image forming stations 3Y, 3C, 3M, and 3K start the image forming operations in order in a direction of movement of the intermediate transfer belt 20.

The surface of each of the photoreceptors 10Y, 10C, 10M, and 10K is cleaned by a cleaning blade 13a, shown in FIG. 3, of the cleaner 13 after the primary transfer process as preparation for subsequent image formation.

The toners contained in the toner bottles 7Y, 7C, 7M, and 7K are supplied through transport paths, not shown, to the developing unit 12Y, 12C, 12M, and 12K in the image forming stations 3Y, 3C, 3M, and 3K, respectively, as required.

While the processes described above are performed, the sheets P are fed one by one from the sheet cassette 2 by the feed roller 27 to the housing 1 and transported therethrough to the registration rollers 28. The registration rollers 28 forward the sheet P to a secondary transfer position, where the secondary transfer 25 transfers the toner image from the intermediate transfer belt 20 onto the sheet P. After the toner image is then fixed on the sheet P while the sheet P passes though the fixer 6, the discharge roller 29 discharges the sheet P onto the discharge tray 8.

After the secondary transfer process, the belt cleaner 26 removes any toner remaining on the intermediate transfer belt 20.

It is to be noted that, although the description above concerns an intermediate transfer method, alternatively, the image forming apparatus 100 may adopt a direct transfer method in which toner images formed on multiple photoreceptors are directly transferred onto a sheet transported by a transport belt.

The optical writing unit 4 is described below with reference to FIG. 4.

Figure 4:
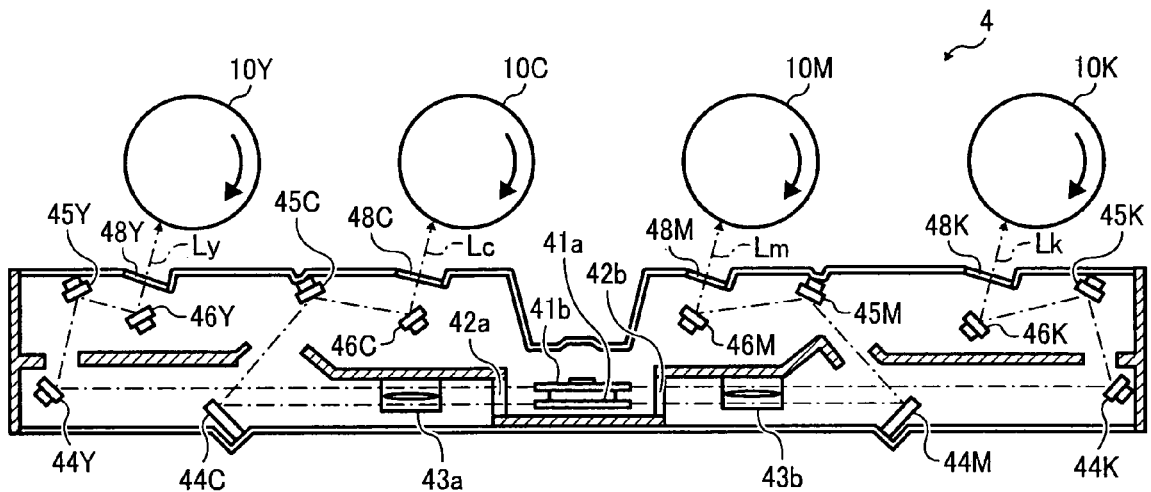
FIG. 4 illustrates an optical writing unit and four photoreceptors included in the image forming apparatus shown in FIG. 2.

FIG. 4 illustrates the optical writing unit 4 together with the four photoreceptors 10Y, 10C, 10M, and 10K. As shown in FIG. 4, the optical writing unit 4 includes polygon mirrors 41a and 41b shaped like regular-polygon columns, first reflection mirrors 44Y, 44C, 44M, and 44K, second reflection mirrors 45Y, 45C, 45M, and 45K, and third reflection mirrors 46Y, 46C, 46M, and 46K.

Although not shown in FIG. 4, the optical writing unit 4 further includes a laser diode as the optical beam emitter to beam writing lights (laser lights) Ly, Lc, Lm, and Lk.

Each of the polygon mirrors 41a and 41b in the present embodiment has six faces, each of which is provided with a reflection mirror, and these polygon mirrors 41a and 41b are vertically connected together concentrically, with centers of the regular-polygon columns aligned with each other. The polygon mirrors 41a and 41b are rotated at high speed on an identical rotation axis by a polygon motor, not shown. As the polygon mirrors 41a and 41b rotate, their mirror faces deflect the writing lights Ly, Lc, Lm, and Lk in the main scanning direction so as to scan the surface of the photoreceptors 10Y, 10C, 10M, and 10K, respectively.

It is to be noted that the polygon mirror 41a deflects the writing lights Lc and Lm that are directed thereto from opposite directions, and the polygon mirror 41b deflects the writing lights Ly and Lk that are directed thereto from opposite directions.

In the present embodiment, the polygon mirrors 41a and 41b and a polygon motor, not shown, serve as a deflector assembly to deflect the writing lights Ly, Lc, Lm, and Lk, and the polygon mirrors 41a and 41b serve as a deflecting unit. The optical writing unit 4 further includes four reflection optical systems for yellow, cyan, magenta, and black, soundproof glasses 42a and 42b, scan lenses 43a and 43b, and dustproof glasses 48Y, 48C, 48M, and 48K.

The polygon motor, not shown, and the polygon mirrors 41a and 41b are covered with a polygon cover to muffle the sound thereof. The polygon cover is provided with the soundproof glasses 42a and 42b, and the writing lights Ly, Lc, Lm, and Lk (optical beams) pass through the polygon cover through one of the soundproof glasses 42a and 42b.

It is to be noted that writing lights Ly and Lc pass through the soundproof glass 42a, and the writing lights Lm and Lk pass through the soundproof glass 42b.

After passing though the soundproof glass 42a while being deflected by one of the polygon mirrors 41a and 41b, the writing lights Ly and Lc further penetrate the scan lens 43a in vertical alignment. The scan lens 43a changes uniform angular movement of the polygon mirrors 41a and 41b into uniform linear movement by concentrating the writing lights Ly and Lc in both the main scanning direction and sub scanning direction.

Further, the scan lens 43a corrects optical face tangle error of the polygon mirrors 41a and 41b. Optical face tangle error means that a reflection face of the polygon mirrors is relatively oblique in a sub-scanning direction due to error in construction and makes scanning pitch uneven.

By contrast, the writing lights Lm and Lk pass through the polygon cover through the soundproof glass 42b and further pass through the scan lens 43b located opposite the scan lens 43a with respect to the polygon cover.

Each of the four reflection optical systems of the optical writing unit 4 includes one laser diode, not shown, the first reflection mirror 44, the second reflection mirror 45, and the third reflection mirror 46. More specifically, for example, the yellow reflection optical system includes the laser diode for yellow, the first reflection mirror 44Y, the second reflection mirror 45Y, and the third reflection mirror 46Y. Each of the first reflection mirror 44Y, the second reflection mirror 45Y, and the third reflection mirror 46Y are mirrors without lens mechanisms.

After passing through one of the scan lens 43a and 43b, the writing lights Ly, Lc, Lm, and Lk are directed to the first reflection mirror 44, the second reflection mirror 45, and the third reflection mirror 46 in the reflection optical systems, respectively.

More specifically, in a case of yellow, after passing though the scan lens 43a, the writing light Ly changes directions three times by being reflected by the first reflection mirror 44Y, the second reflection mirror 45Y, and the third reflection mirror 46Y sequentially, and then reaches the surface of the photoreceptor 10Y. Similarly, the writing lights Lc, Lm, and Lk are directed to the surface of the photoreceptors 10C, 10M, and 10K, respectively.

It is to be noted that, after being reflected by the third reflection mirrors 46Y, 46C, 46M, and 46K, the writing lights Ly, Lc, Lm, and Lk pass through the dustproof glasses 48Y, 48C, 48M, and 48K provided on an upper surface of the optical writing unit 4 and then reach the surface of the photoreceptors 10Y, 10C, 10M, and 10K, respectively.

Features of the present embodiment are further described below.

Each reflection optical system of the optical writing unit 4 is provided with a curvature adjustment unit and an inclination adjuster. The curvature adjustment unit includes a holder structure and a pressure unit and adjusts a direction and an amount of curvature of a main scanning line, which is a line of a writing light scanning the surface of the photoreceptor 10 in the main scanning direction, by adjusting curvature of one of the reflection mirrors 44, 45, and 46. The inclination adjuster adjusts inclination of the reflection mirrors 44, 45, and 46.

The structure and operation of the curvature adjustment unit and the inclination adjuster are described below using the yellow reflection optical system as an example, with reference to FIGS. 5 through 10.

Figure 5:
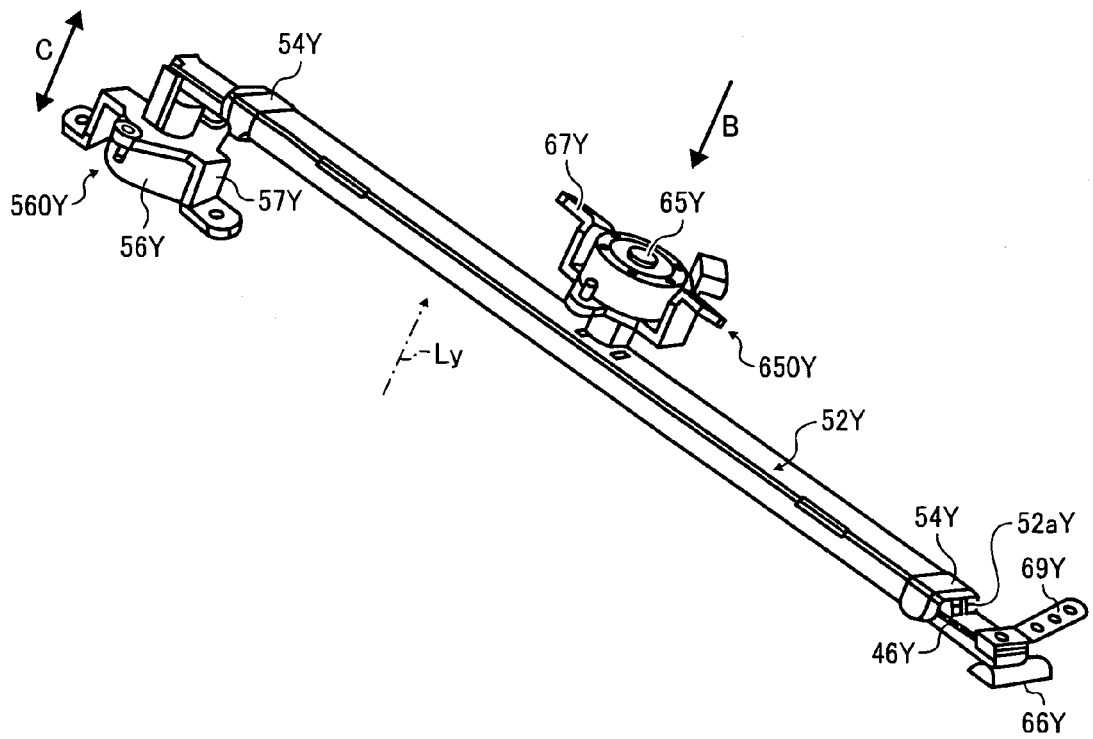
FIG. 5 is a perspective view illustrating a configuration around a third reflection mirror included in the optical writing unit shown in FIG. 4, as viewed from a back side.

FIG. 5 is a perspective view illustrating a configuration around the third reflection mirror 46Y, as viewed from a back side that is opposite a mirror side onto which the writing light Ly is directed.

As shown in FIG. 5, the third reflection mirror 46Y is held by a holder 52Y with both end portions thereof in a longitudinal direction projecting from the holder 52Y. One of the end portions of the reflection mirror 46Y contacts an inclination adjustment unit 560Y serving as the inclination adjuster that includes a pulse motor 56Y and a motor holder 57Y. The end portion of the reflection mirror 46Y on the side where the inclination adjustment unit 560Y is located is swingable in a direction indicated by arrow C. The side where the inclination adjustment unit 560Y is located is hereinafter referred to as an adjuster side.

Further, projections 52aY protruding toward the third reflection mirror 46Y are provided on both end portions of the holder 52Y, respectively. Fixing members 54Y respectively located at both end portions of the reflection mirror 46Y bind together the third reflection mirror 46Y the holder 52Y, and positions of the fixing members are closer to a center portion of the third reflection mirror 46Y in the longitudinal direction than positions of the projections 52aY. Hereinafter the center portion of the third reflection mirror 46Y in the longitudinal direction is simply referred to as a center portion of the third reflection mirror 46Y unless otherwise specified. The holder 52Y and the fixing members 54Y serve as the holder structure.

The side of the third reflection mirror 46Y in the longitudinal direction opposite the adjuster side is hereinafter referred to as a support side. The end portion of the third reflection mirror 46Y on the support side is mounted on a mount 66Y that is fixed to the housing 1 of the image forming apparatus 100 shown in FIG. 2. This end portion on the support side is sandwiched between the mount 66Y and a plate spring 69 that presses against the back side thereof and is fixed to the housing 1 of the image forming apparatus 100 shown in FIG. 2.

A pressure unit 650Y including a curvature adjustment pulse motor 65Y and a motor holder 67 is attached to a back surface of the holder 52Y opposite its surface facing the third reflection mirror 46Y. This pressure unit 650Y pushes the center portion of the third reflection mirror 46Y in a direction indicated by arrow B.

Figure 6:
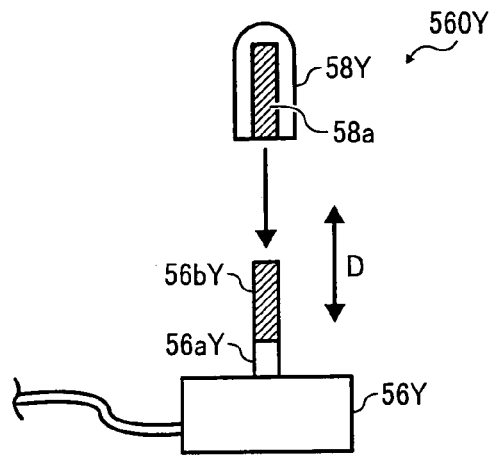
FIG. 6 is a side view illustrating an inclination adjustment unit included in the optical writing unit shown in FIG. 4, as viewed from a side.
Figure 7:
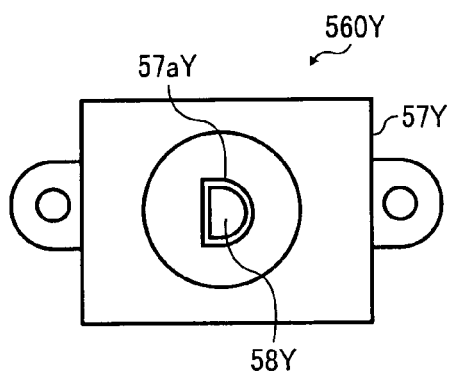
FIG. 7 is a plan view illustrating the inclination adjustment unit shown in FIG. 6.

FIG. 6 is a lateral side view illustrating the inclination adjustment unit 560Y, as viewed from a side, and FIG. 7 is a plan view thereof.

As shown in FIG. 6, the inclination adjustment unit 560Y further includes an adjuster 58Y. The pulse motor 56Y includes a rotary shaft 56aY on which a male screw 56bY is provided. The male screw 56bY of the pulse motor 56Y engages a female screw 58a provided inside the adjuster 58Y, attaching the adjuster 58Y to the rotary shaft 56aY.

As shown in FIG. 7, the adjuster 58Y has a D-shaped cross-section and is inserted into a D-shaped engagement portion 57aY provided on the motor holder 57. Thus, the adjuster 58Y engages the engagement portion 57aY and does not rotate even when the rotary shaft 56aY of the pulse motor 56Y rotates. As the rotary shaft 56aY rotates, the adjuster 58Y moves vertically, as indicated by arrow D in FIG. 6, due to engagement of the male screw 56bY and the female screw 58a.

In FIG. 5, the motor holder 57Y holding the pulse motor 56Y is fixed to the housing 1 of the image forming apparatus 100 shown in FIG. 2, and an end portion of the adjuster 58Y engaging the male screw 56bY of the pulse motor 56Y contacts a mirror surface of the end portion of the third reflection mirror 46Y, although not shown in FIG. 5.

Referring to FIGS. 5 and 6, when the adjuster 58Y engaging the rotary shaft 56aY of the pulse motor 56Y is vertically moved by rotation of the rotary shaft 56aY, a distance (amount) that the adjuster 58Y pushes the end portion of the third reflection mirror 46Y on the adjuster side to move changes. As this distance changes, the adjuster side end portion of the third mirror 46Y swings on its support side end portion that is sandwiched between the mount 66Y and the plate spring 69 in a direction, indicated by arrow C, in which the adjuster 58Y moves. As the end portion of the third mirror 46Y on the adjuster side swings, the inclination of the third reflection mirror 46Y changes. Thus, the inclination of the third reflection mirror 46Y is adjusted by changing an amount of rotation of the pulse motor 56Y.

It is to be noted that, alternatively, a cam can be used as the adjuster 58Y.

Figure 8:
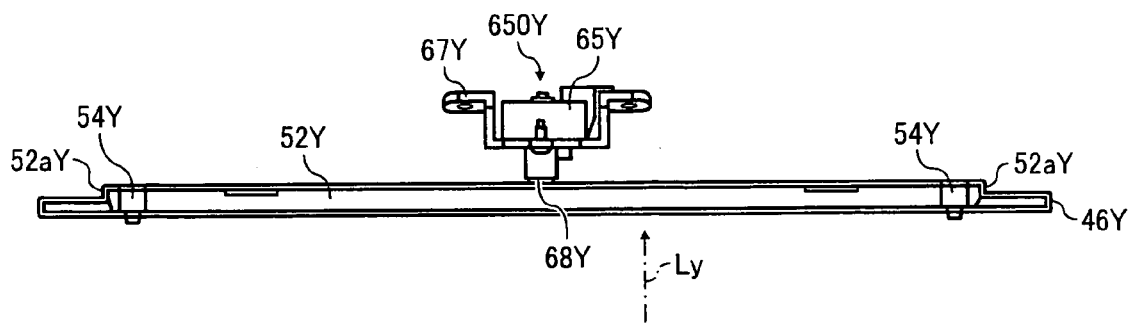
FIG. 8 is a plan view illustrating the configuration around the third reflection mirror shown in FIG. 5, as viewed from a direction perpendicular to a direction in which a writing light travels.

FIG. 8 is a plan view illustrating a configuration around the third reflection mirror 46Y, as viewed from a direction perpendicular to a direction in which the writing light Ly travels.

The pressure unit 650Y including the curvature adjustment pulse motor 65Y and the motor holder 67Y is attached to the back surface of the holder 52Y, as described above. As shown in FIG. 8, the pressure unit 650 further includes a curvature adjuster 68Y engaging a rotary shaft of the curvature adjustment pulse motor 65Y, and an apex of the curvature adjuster 68Y contacts the back surface of the center portion of the holder 52Y in the longitudinal direction. For example, a female screw is provided inside the curvature adjuster 68Y and engages a male screw provided on the rotary shaft of the curvature adjustment pulse motor 65Y.

Thus, the curvature adjustment unit includes the pressure unit 650Y, the holder 52Y, and the fixing members 54Y.

As the curvature adjustment pulse motor 65Y rotates, the curvature adjuster 68Y moves vertically according to screw mechanism similar to that of the inclination adjustment unit 560Y shown in FIG. 6 to push to move a center portion of the third reflection mirror 46Y in a direction opposite the direction of the forcible curve caused by the holder structure. That is, the curvature adjustment pulse motor 65Y changes the distance (amount) that the curvature adjuster 68Y push to move the center portion of the third reflection mirror 46Y in a direction opposite the direction of the forcible curve.

In other words, an amount that the pressure unit 650 deforms the third reflection mirror 46Y is changed by changing an amount of rotation of the curvature adjustment pulse motor 65Y, and the curvature of the main scanning line is adjusted by changing the deformation amount of the third reflection mirror 46Y.

It is to be noted that, alternatively, a cam can be used as the curvature adjuster 68Y.

Figure 9:
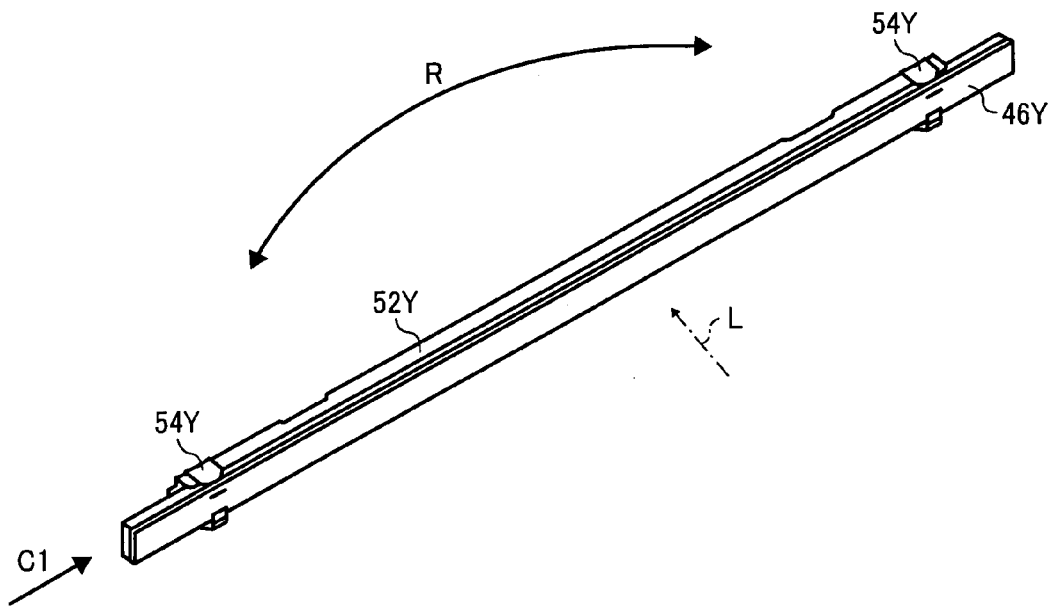
FIG. 9 is a perspective view illustrating the third reflection mirror shown in FIG. 5 and a holder, as viewed from a mirror side.
Figure 10:
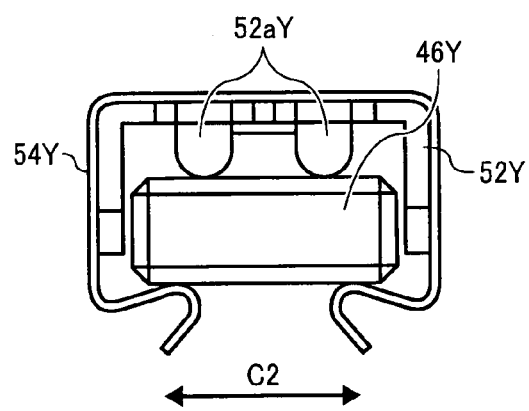
FIG. 10 is a side view illustrating the holder and the third reflection mirror shown in FIG. 9, as viewed from a side of an end portion in a longitudinal direction.

FIG. 9 is a perspective view illustrating the third reflection mirror 46Y and the holder 52Y as viewed from the mirror side, and FIG. 10 is an end-on side view thereof as viewed from a side of the end portion that is a direction indicated by arrow C1 shown in FIG. 9.

As shown in FIG. 9, the fixing members 54Y binding the third reflection mirror 46Y and the holder 52Y together at both end portions thereof are C-shaped.

As shown in FIG. 10, the projections 52a Y of the holder 52Y contact the back surface of the third reflection mirror 46Y, and plate spring portions are provided on an opening of each C-shaped fixing member 54Y. These plate spring portions of each fixing member 54Y engage, like a hook, edge portion of the third reflection mirror 46Y in a direction indicated by arrow C2, thus pushing the third reflection mirror 46Y to the holder 52Y.

The plate spring portions of each fixing member 54Y push the third reflection plate 46Y at the portion closer to the center portion than the positions of the projections 52a Y as described above, thus curving the third reflection mirror 46Y in a direction indicated by a curve line R so that its center portion project toward the side of the holder 52Y. Thus, the holder 52Y and the fixing members 54Y forcibly hold the third reflection mirror 46Y in a curved state.

Although the forcibly curved state of the third reflection mirror 46Y is not recognizable in FIG. 8, its direction is toward the pressure unit 650 as indicated by a curve line R shown in FIG. 9. The curvature adjuster 68Y pushes the center portion of the third reflection mirror 46Y in a direction opposite the forcible curve thereof formed by the holder 52Y and the fixing members 54Y, thus straightening the third reflection mirror 46Y or curving the reflection mirror 46Y to the opposite direction.

In the reflection optical system described above, because the third reflection mirror 46Y can be curved in both the mirror side and the back side as described above, curvature of the main scanning line on the photoreceptor 10 in the sub scanning direction can be corrected-even when the main scanning line projects either upstream or downstream in the sub scanning direction.

It is to be noted that the cyan, magenta, and black reflection optical systems are configured similarly to the yellow reflection optical system, although the description above concerns the inclination adjustment unit 560 and the curvature adjustment unit including the holder 52, the fixing members 54, and the pressure unit 650 of the yellow reflection optical system. However, whereas the inclination adjustment unit 560 and the curvature adjustment unit are attached to the third reflection mirror 46 in yellow and cyan reflection optical systems, these are attached to the second reflection mirror 45 in the magenta and black reflection optical systems.

Curvature of the reflection mirror and the curvature of the main scanning line on the photoreceptor 10 are described in detail below with reference to FIGS. 11 through 18.

Figure 11:
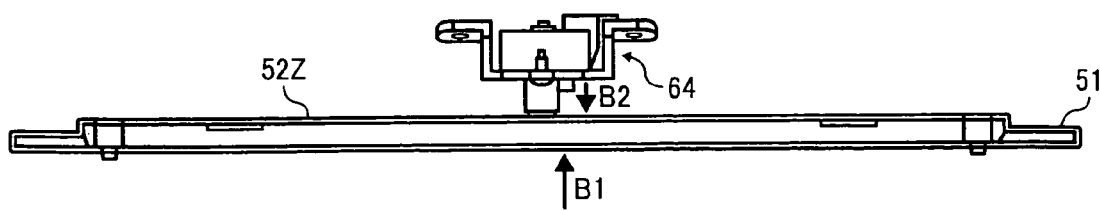
FIG. 11 illustrates a configuration around a reflection mirror included in a comparative optical writing unit.

FIG. 11 illustrates a configuration around a reflection mirror 51 of a comparative optical writing unit. The reflection mirror 51 is one of multiple reflection mirrors to direct a writing light (optical beam) onto one of multiple photoreceptors, not shown, reflecting the writing light several times.

The reflection mirror 51 is held by a holder 52Z provided on its back side that is a non-mirror side. This holder 52Z holds the reflection mirror 51 in a forcibly curved state in which a center portion thereof in a longitudinal direction projects from a mirror side to the back side that is a direction indicated by arrow B1. Further, a pressure unit 64 is provided on a back side of the holder 52Z opposite a side of the reflection mirror 51 and pushes the center portion of the reflection mirror 51 via the holder 52Z to the mirror side that is a direction indicated by arrow B2.

Figure 12:
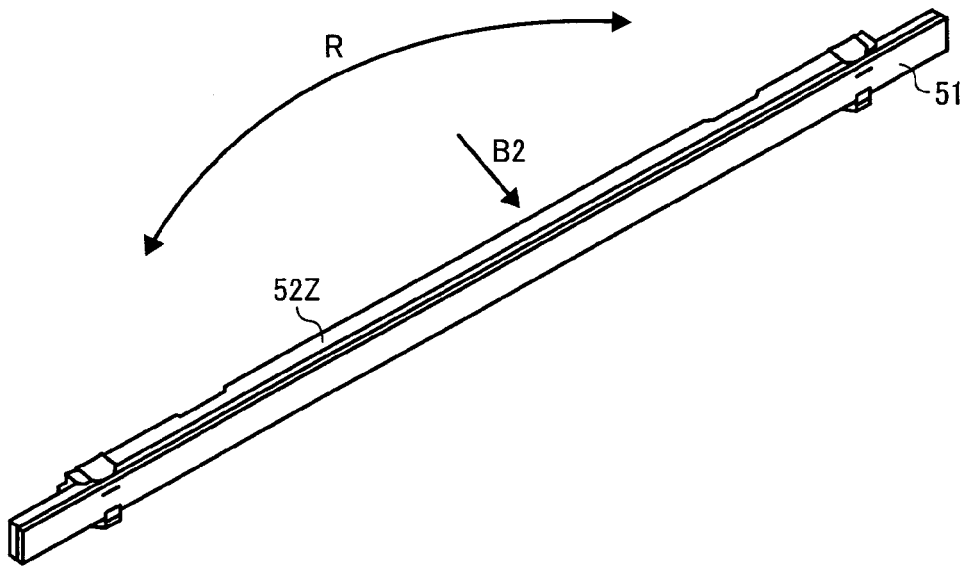
FIG. 12 illustrates the reflection mirror shown in FIG. 11 that is curved forcibly.
Figure 13:
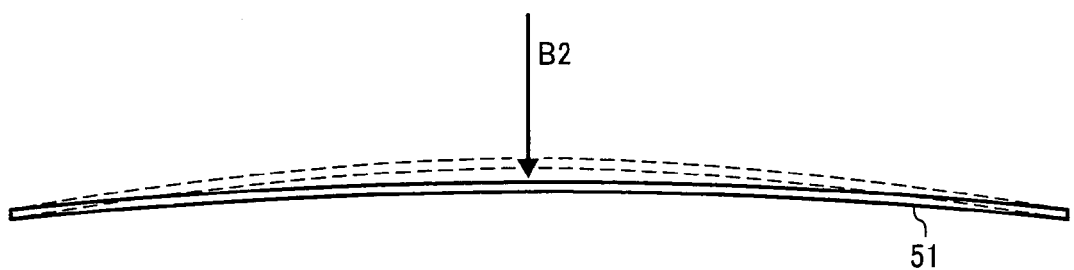
FIG. 13 illustrates a main scanning line when the reflection mirror shown in FIG. 11 is slightly pushed by a pressure unit in a direction opposite a direction of the forcible curve.

While the pressure unit 64 does not push the reflection mirror 51, the reflection mirror 51 curves in a direction indicated by a curve line R shown in FIG. 12. By contrast, while the pressure unit 64 shown in FIG. 11 pushes the reflection mirror 51 slightly in the direction indicated by arrow B2, an amount of curvature of the reflection mirror 51 decreases as shown in FIG. 13.

Figure 14:
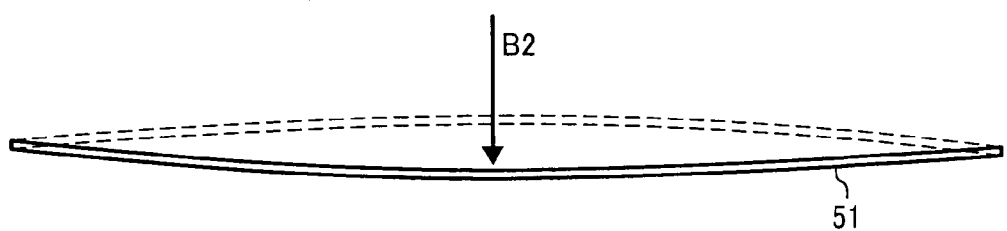
FIG. 14 illustrates a main scanning line when the reflection mirror shown in FIG. 11 is relatively strongly pushed by a pressure unit in a direction opposite a direction of the forcible curve.

When the pressure unit 64 shown in FIG. 11 pushes the reflection mirror 51 further, the reflection mirror 15 curves in a direction opposite the forcible curvature formed by the holder 52Z as shown in FIG. 14. Thus, the reflection mirror 51 can be curved in both the mirror side and the back side.

Processes of adjustment of the main scanning line are described below.

The main scanning lines on the photoreceptors are typically adjusted before shipment and at predetermined or preferable intervals during operation. In the present embodiment, the main scanning lines on the respective photoreceptors are adjusted each time a predetermined or preferable number of sheets are printed or at timing designated by the user during operation.

In adjustment of the inclination of the main scanning lines, first, electrostatic latent images for detecting positional deviation are formed on the photoreceptors 10Y, 10C, 10M, and 10K shown in FIG. 4, and developed with respective color toners into detection toner images, respectively, through processes similar to the normal image forming processes described above. These detection toner images are transferred onto different positions of the intermediate transfer belt 20 shown in FIG. 3, and thus the respective color detection toner images are aligned in a predetermined or preferable pattern. As the intermediate transfer belt 20 moves endlessly, an optical sensor, not shown, detects these detection toner images.

The controller, not shown, determines deviation in relative positions among the detection toner images according to a timing with which the optical sensor, not shown, detects the detection toner images and then calculates an amount of inclination of the yellow, cyan, and magenta main scanning lines, respectively, with respect to the black main scanning line based on results of the detection so as to minimize the positional deviation.

Further, in the case of yellow, the controller, not shown, rotates the pulse motor 56Y of the inclination adjustment unit 560Y shown in FIG. 5 in either a positive direction or a reverse direction for a predetermined or preferable rotation angle. When the inclination of the third reflection mirror 46Y is thus adjusted, accordingly an incident position of the writing light Ly on the mirror surface changes, and thus the inclination of the yellow main scanning line on the photoreceptor 10Y changes. The inclination of the cyan and magenta main scanning lines is similarly adjusted.

Figure 15:
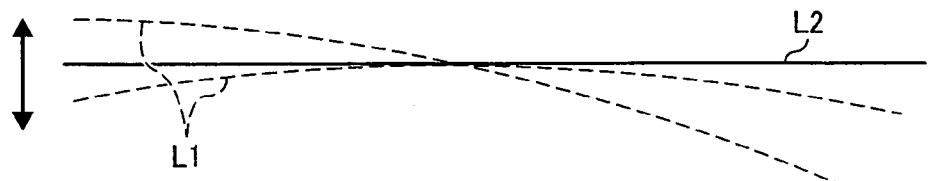
FIG. 15 illustrates a main scanning line whose inclination is adjusted.

FIG. 15 illustrates main scanning lines L1, indicated by dotted lines, that are not adjusted and an adjusted main scanning line L2 indicated by a solid line. The inclination of the main scanning lines L1 can be adjusted to the main scanning line L2 through the processes described above.

Adjustment of curvature of the main scanning line is described below with reference to FIG. 16.

The curvature of the main scanning lines on the respective photoreceptors 10 is adjusted at a timing similar to that of the inclination adjustment. In an initial state of the image forming apparatus 100 immediately after being assembled, the reflection mirror is curved in the direction indicated by the curve line R shown in FIG. 9. In such an initial state, the main scanning line curves like an initial main scanning line L3 indicated by a dotted line shown in FIG. 16. In FIG. 16, a reference character L4 indicates an adjusted main scanning line indicated by a solid line.

Figure 16:
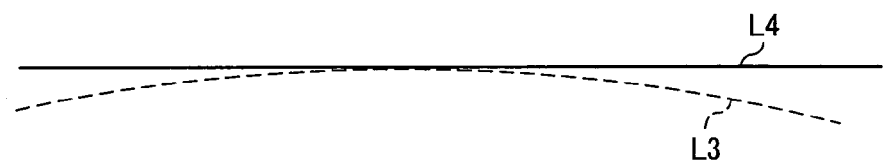
FIG. 16 illustrates a main scanning line whose curvature is adjusted.

The curvature of the initial main scanning line L3 shown in FIG. 16 can be corrected by rotating, in the case of yellow, the curvature adjustment pulse motor 65Y shown in FIG. 8 in such initial state so as to move the curvature adjuster 68Y to contact the back surface of the center portion of the third reflection mirror 46Y and then adjusting an amount of elevation of the curvature adjuster 68Y pushing against the third reflection mirror 46Y.

The curvature adjustment described above is performed along with the inclination adjustment. More specifically, the controller, not shown, includes a CPU (central processing unit) and determines an amount of curvature of the main scanning line for each color based on the results of the detection of the toner images for positional deviation and then calculates an amount of inclination of the reflection mirror for each color so as to minimize the curvature of the main scanning lines.

Further, the controller, not shown, rotates the curvature adjustment pulse motor 65Y shown in FIG. 8 in either a positive direction or a reverse direction for a predetermined or preferable rotation angle so as to change the amount of deformation of the third reflection mirror caused by the pressure unit 650. Thus, the direction and the amount of the curvature of the third reflection mirror 46Y are changed, which can correct the main scanning line. The cyan, magenta, and black main scanning lines are similarly adjusted.

Figure 17:
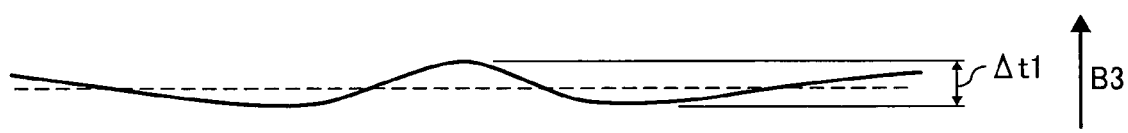
FIG. 17 illustrates a main scanning line on one of multiple photoreceptors included in a tandem image formation apparatus after curvature adjustment.
Figure 18:
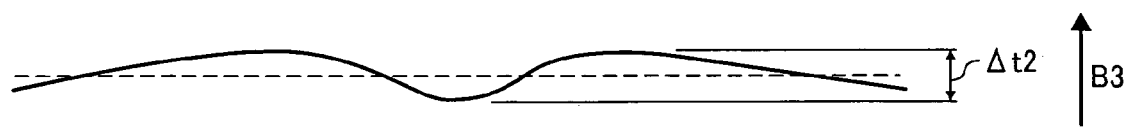
FIG. 18 illustrates a main scanning line on another photoreceptor included in the tandem image formation apparatus after curvature adjustment.

However, an actual main scanning line after adjustment might be W-shaped as shown in FIG. 17 or M-shaped as shown in FIG. 18. Therefore, differences in the shape of the main scanning line after adjustment is described below.

When images are formed using an image forming apparatus including the comparative optical writing unit shown in FIG. 11, slight color deviation will occur. Such slight color deviation can be caused when shapes of main scanning lines on multiple photoreceptors differ from each other after being corrected.

FIG. 17 illustrates a corrected main scanning line on one of the multiple photoreceptors, and FIG. 18 illustrates a corrected main scanning line on another photoreceptor. In each of FIGS. 17 and 18, a dotted line indicates an ideal main scanning line that is straight, and a solid line indicate an actual corrected main scanning line.

The actual corrected main scanning lines shown in FIGS. 17 and 18 wave slightly within widths Δt1 and Δt2, respectively. As is clear when these corrected main scanning lines are compared, the shapes of the corrected main scanning lines on different photoreceptors are different from each other.

More specifically, the corrected main scanning line shown in FIG. 17 is W-shaped having a center apex projecting downstream and both end portions projecting upstream in a direction indicated by arrow B3. By contrast, the corrected main scanning line shown in FIG. 18 is M-shaped having center apex projecting upstream and both end portions projecting downstream in the direction indicated by arrow B3.

Thus, when the shape of the corrected main scanning lines on two photoreceptors differ from each other, dots formed at positions of the upstream projections of the W-shaped main scanning line deviate slightly from those formed at positions of the downstream projections of the M-shaped main scanning line. In order to reduce or prevent such deviation, the main scanning lines on respective photoreceptors preferably have an identical or similar shape.

In FIGS. 17 and 18, the curvature of the center portion of the main scanning line projects in opposite directions because an initial curvature of the reflection mirror 51 shown in FIG. 11 projects in opposite directions between FIGS. 17 and 18. The initial curvature of the reflection mirror 51 is caused by the holder 52Z while the pressure unit 64 does not push the reflection mirror 51.

The direction of the initial curvature of the reflection mirror is different when the reflection mirrors provided in the multiple photoreceptors face opposite directions although being forcibly curved in a similar direction (from the mirror side to the back side) by the holder.

Further, the main scanning line projects in different directions when the optical beam is reflected in a different number of times after being reflected by the reflection mirror provided with the curvature adjustment unit, that is, when the number of the reflection mirrors provided downstream of that reflection mirror in an optical beam path is different, even when the reflection mirrors provided in the multiple photoreceptors face a similar direction. The main scanning line is reversed and accordingly its shape changes between W-shape and M-shape each time it is reflected downstream of that reflection mirror being curved by the holder, which is hereinafter referred to as a curvature correction mirror.

An experiment was performed using another comparative optical writing unit whose configuration is similar to that of the optical writing unit 4 shown in FIGS. 4 through 10, except that the inclination adjuster and the curvature adjustment unit are provided on the third reflection mirror 46 in all of the yellow, cyan, magenta, and black reflection optical systems.

When color images were formed using the comparative optical writing unit described above, slight color deviation occurred. The main scanning lines were W-shaped in the yellow and cyan reflection optical system as shown in FIG. 17 and M-shaped in the magenta and black reflection optical systems as shown in FIG. 18. One reason for such differences is that the third reflection mirrors in the yellow and cyan reflection optical systems and those in the magenta and black reflection optical systems face in opposite directions as shown in FIG. 4 in which the third reflection mirror 46Y and 46C face the left and the third reflection mirrors 46M and 46K face the right in FIG. 4.

Referring to FIG. 4, in either reflection optical system, the third reflection mirror 46 is provided the furthest downstream of all the multiple reflection mirrors in the optical beam path. The third reflection mirrors 46Y and 46C and the third reflection mirrors 46M and 46K face in opposite directions because their relative position with the polygon mirrors 41a and 41b is different from each other.

More specifically, the sub scanning direction, which is the direction in which the photoreceptor 10Y rotates, is from the right to the left in FIG. 4 at a contact point between the photoreceptor 10 and the writing light L.

As shown in FIG. 4, the yellow reflection optical system is located downstream of the polygon mirrors 41a and 41b in the sub scanning direction described above. Similarly, the cyan reflection optical system is located downstream of the polygon mirrors 41a and 41b in the sub scanning direction. By contrast, the magenta and black reflection optical systems are located upstream of the polygon mirrors 41a and 41b in the sub scanning directions. Thus, due to the differences in relative position with the polygon mirrors 41a and 41b, the reflection mirrors having identical alignment order in the direction in which the writing light travels in the respective reflection optical systems face in opposite directions. That is, the second reflection mirrors 46Y and 46C and the second reflection mirrors 46M, and 46K face in opposite directions, and the third reflection mirrors 46Y and 46C and the third reflection mirrors 46M and 46K face in opposite directions.

The relative position of the yellow and cyan reflection optical systems with the polygon mirrors 41a and 41b in the sub scanning direction is opposite that of the magenta and black reflection optical systems because the polygon mirrors 41a and 41b are located between the yellow and cyan reflection optical systems and the magenta and black reflection optical systems as shown in FIG. 4.

The layout described above is intended to make the optical writing unit 4 compact and enhance the accuracy of scanning positions. More specifically, if all the reflection optical systems are located either downstream or upstream of the polygon mirrors 41a and 41b in the sub scanning direction in the optical writing unit 4, the polygon mirrors 41a and 41b must be located on the right or left of all the reflection optical systems in FIG. 4. Such a layout will expand the optical writing unit 4 horizontally.

Further, if the polygon mirrors 41a and 41b are located, for example, on the left of the yellow reflection optical system in FIG. 4, the optical beam path between the polygon mirrors 41a and 41b and the black reflection optical system becomes longer, which will decrease accuracy of the black scanning position. If the polygon mirrors 41a and 41b are located on the right of the black reflection optical system in FIG. 4, accuracy of the yellow scanning position will decrease similarly.

From the reasons described above, the polygon mirrors 41a and 41b are located between the yellow and cyan reflection optical systems and the magenta and black reflection optical systems in the present embodiment.

In view of the foregoing, in the present embodiment, the inclination adjustment unit and the curvature adjustment unit are provided on the second reflection mirrors 45M and 45K in the magenta and black reflection optical systems, respectively, as described above. In this configuration, the magenta and black main scanning lines, which are M-shaped on the second reflection mirrors 45M and 45K, are reflected to be W-shaped on the third reflection mirrors 46M and 46K and then directed to the photoreceptor 10M and 10K, respectively. Thus, the main scanning line is W-shaped on all the photoreceptors 10Y, 10C, 10M, and 10K, and accordingly the color deviation in the superimposed toner image can be further reduced.

It is to be noted that, alternatively, the inclination adjustment unit and the curvature adjustment unit are provided on the second reflection mirrors 45Y and 45C in the yellow and cyan reflection optical systems and on the third reflection mirrors 46M and 46K in the magenta and black reflection optical systems. In this case, all the main scanning lines of the respective photoreceptors 10 are M-shaped.

In other words, in one of the yellow and cyan reflection optical systems, which are located downstream of the polygon mirrors 41a and 41b in the sub scanning direction, and the magenta and black reflection optical systems, which are located upstream of the polygon mirrors 41a and 41b in the sub scanning direction, the curvature adjustment unit is provided on the reflection mirror whose alignment order in the direction in which the optical beam (writing light) travels is odd. The direction in which the optical beam travels is hereinafter referred to as the direction of optical beam. Further, in the other reflection optical systems, the curvature adjustment unit is provided on the reflection mirror whose alignment order in the direction of optical beam is even.

In the configuration described above, when the polygon mirrors 41a and 41b are provided between the yellow and cyan reflection optical systems and the magenta and black reflection optical systems, the main scanning lines on the respective photoreceptors 10 can have a similar shape.

As described above, the optical writing unit 4 according to the present embodiment includes the optical beam emitters, the multiple reflection optical systems, and the deflector assembly including the polygon mirrors 41a and 41b. The reflection optical systems direct the different writing lights emitted by the optical beam emitters to different objects to be scanned, respectively.

Each reflection optical system includes the first reflection mirror 44, the second reflection mirror 45, and the third reflection mirror 46, and an inclination adjustment unit to adjust inclination of at least one of the reflection mirrors.

Each reflection optical system further includes the curvature adjustment unit including the holder structure, the pressure unit, and the curvature adjuster. The holder structure includes the holder 52 and the fixing members 54, and forcibly curves at least one of those reflection mirrors that is the curvature correction mirror in the direction opposite the main scanning direction. The pressure unit 650 includes the curvature adjustment pulse motor 65 to push the curvature correction mirror in the direction opposite the direction of the initial curvature and adjusts the direction and the amount of the curve of the main scanning direction on the photoreceptor 10 by changing the amount (distance) the pressure unit 650 moves the center portion of the curvature correction mirror in the direction opposite the direction of the initial curvature (forcible curve), that is, the amount that the pressure unit 650 deforms the curvature correction mirror.

Further, the direction of the initial curvature of the main scanning line caused by the holder structure is similar on all of the objects to be scanned (photoreceptors 10). Because the pressure unit 650 pushes the curvature correction mirror in this state, the main scanning lines on the all the objects to be scanned have a similar shape, and thus color deviation of a multicolor image can be reduced.

For example, the initial curvature of the main scanning line can be in a similar direction on the different objects by setting their directions individually in the reflection optical systems, and then setting their directions to a similar direction.

When each of the reflection optical systems includes multiple reflection mirrors, even if the main scanning lines in the reflective optical systems curve in different directions from each other immediately after being reflected by the curvature correction mirror, the direction of the initial curvature of the main scanning line can be similar in respective reflection optical systems as follows: While the main scanning lines curving in one direction are reflected an even number of times, the other main scanning lines are reflected an odd number of times. Alternatively, the main scanning lines curving in one direction may be reflected zero times and the other main scanning lines may be reflected once.

In other words, even if the direction of the initial curvature of the main scanning line is different in the reflective optical systems immediately after being reflected by the curvature correction mirror, their directions can be similar when alignment order of the reflection mirror serving as the curvature correction mirror is different in the respective reflection optical systems.

Further, in the present embodiment, the magenta and black reflection optical systems are located downstream of the deflecting unit in the sub scanning direction while the yellow and cyan reflection optical systems are located upstream of the deflecting unit in the sub scanning direction. In this configuration, the optical writing unit 4 can be compact and accuracy of scanning positions can be enhanced.

Further, each reflection optical system includes an identical number of reflection mirrors, that is, three reflection mirrors. While the curvature adjustment unit is provided on the third reflection mirror 46 whose alignment order among those three reflection mirrors is first, an odd number, in a direction opposite the direction of optical beam in the yellow and cyan reflection optical systems, the curvature adjustment unit is provided on the second reflection mirror 45 whose alignment order is second, an even number, in the magenta and black reflection optical systems.

In the configuration described above, the main scanning lines on all the photoreceptors can have a similar shape even when at least one of the reflection optical system is located upstream of the deflecting unit and the rest of those are located downstream thereof for compactness of the optical writing unit and/or higher accuracy of scanning positions.

Figure 19:
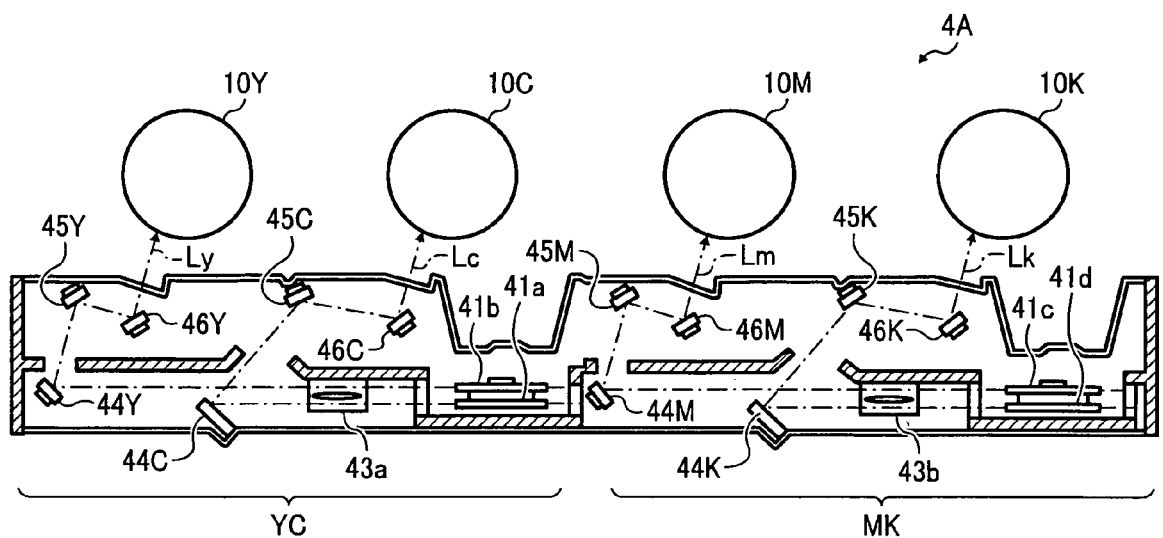
FIG. 19 illustrates an optical writing unit included in an image forming apparatus according to a variation of the illustrative embodiment.

FIG. 19 illustrates an optical writing unit 4A according to a variation of the present embodiment, together with the photoreceptors 10Y, 10C, 10M, and 10K.

As shown in FIG. 19, the optical writing unit 4A includes four reflective optical systems for yellow, cyan, magenta, and black, a deflector assembly, and scan lenses 43a and 43b. The deflector assembly includes two deflecting units.

In other words, the optical writing unit 4A includes two reflection-deflection optical systems YC and MK. The reflection-deflection optical system YC includes the reflection optical systems for yellow and cyan and polygon mirrors 41a and 41b serving as one deflecting unit, and the reflection-deflection optical system MK includes the reflection optical systems for magenta and black and polygon mirrors 41c and 41d serving as another deflecting unit.

In the reflection-deflection optical system YC, the yellow and cyan reflection optical systems are located downstream of the polygon mirrors 41a and 41b in a sub scanning direction in FIG. 19. Similarly, in the reflection-deflection optical system MK, the magenta and black reflection optical systems are located downstream of the polygon mirrors 41c and 41d in the sub scanning direction in FIG. 19.

Each of the reflection optical systems includes a first reflection mirror 44, a second reflection mirror 45, and a third reflection mirror 46 and directs a writing light L emitted by an optical beam emitter, not shown, onto the photoreceptor 10 similarly to those of the optical writing unit 4 shown in FIG. 4.

In the configuration described above, the reflection mirror whose alignment order in the direction of optical beam is identical faces in a similar or identical direction in all of the multiple reflection optical systems. In this configuration, by providing a curvature adjustment unit on the reflection mirror whose alignment order in the direction of optical beam is identical in all the four reflection optical systems, the main scanning lines on the photoreceptors 10Y, 10C, 10M, and 10K have a similar shape.

As described above, in the variation, the deflector assembly includes the multiple deflecting units, and the multiple reflection optical systems are divided into two reflection-deflection groups, the reflection-deflection optical systems YC and MK, each provided with one of the deflecting units. In both reflection-deflection optical systems YC and MK, the relative position of the deflector and each reflection optical system in a sub scanning direction are similar.

In the configuration described above, when the alignment order of the reflection mirror to which the curvature adjustment unit is provided is identical in all reflection optical systems, the main scanning lines on all photoreceptors can have a similar shape.

An optical writing unit according to another variation of the present embodiment is described below. It is to be noted that, unless otherwise specified, the optical writing unit described below has a configuration similar to that of the optical writing unit 4 shown in FIG. 4.

In the present variation, two curvature adjustment units are provided in each of the reflection optical systems for yellow, cyan, magenta, and black. In each reflection optical system shown in FIG. 4, one of these curvature adjustment units is attached to the second reflection mirror 45, and the other curvature adjustment unit is attached to the third reflection mirror 46. As shown in FIG. 4, the second reflection mirrors 45Y and 45C and the third reflection mirrors 46Y and 46C face opposite each other in the yellow and cyan reflection optical systems. Similarly, the second reflection mirrors 45M and 45K and the third reflection mirrors 46M and 46K face opposite to each other in the magenta and black reflection optical systems.

In other words, in the present variation, in each of the reflection optical systems for yellow, cyan, magenta, and black, the alignment order of one curvature correction mirror (third reflection mirror 46) among the multiple reflection mirrors is an odd number and that of the other curvature correction mirror (second reflection mirror 45) is an even number.

In the configuration described above, in each reflection optical system, convexity of the W-shape can be offset by concavity of the M-shape in the main scanning line, and thus the main scanning line can be better straightened. By better straightening the main scanning lines, the optical writing unit can reduce distortion of images as well as the color deviation in multicolor images.

As described above, in the present variation, each reflection optical system includes two curvature correction mirrors that face directions opposite each other in order to better straighten the main scanning line by offsetting the convexity of the W-shape with the concavity of the M-shape.

It is to be noted that the number of the curvature correction mirrors is not limited to two and can be any even number.

Among the even number of the curvature correction mirrors, a first half of the curvature correction mirrors forcibly curve the main scanning line on the object with the holder structure in one direction, and a second half of the curvature correction mirrors curve the main scanning line on the object with the holder structure in the direction opposite the direction of the first half of the curvature correction mirrors. Thus, the optical writing unit can reduce distortion of images as well as the color deviation.

As described above, in the present variation, the alignment order of the third reflection mirror 46, which is the first half of the curvature correction mirrors, is an odd number, first, in the direction opposite the direction of the optical beam, and the alignment order of the second reflection mirror 45, which is the second half of the curvature correction mirrors, is an even number, second, in the direction opposite the direction of the optical beam. Thus, the first half and the second half of the curvature correction mirrors face opposite to each other so as to offset the convexity of the W-shape with concavity of the M-shape in the main scanning lines.

Although the variation described above concerns the optical writing unit that can better straighten the main scanning lines, the color deviation can be prevented or reduced when the main scanning lines in the multiple reflection optical systems have a similar shape.

In other words, even when the respective main scanning lines are not straight, the respective main scanning lines can be substantially consistent relatively when the direction and the amount of the curve thereof are similar to each other. Thus, it is not necessary to correct the main scanning lines into an ideal shape in order to reduce positional deviation in multicolor images.

Setting of the main scanning lines to have a similar shape in the respective reflection optical systems is described below with reference to FIGS. 20 and 21.

Figure 20:
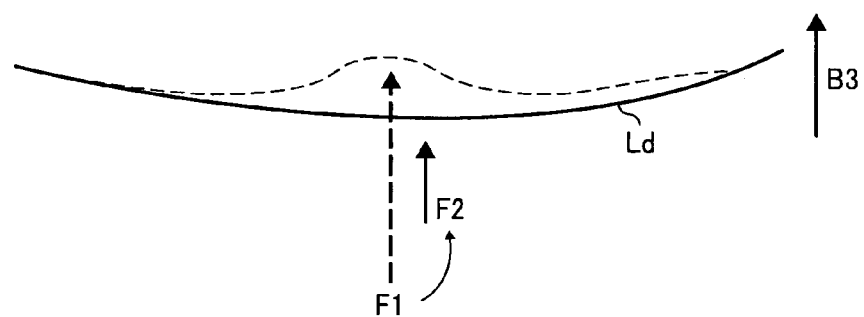
FIG. 20 illustrates a main scanning line when a distance the pressure unit pushes a center portion of the reflection mirror shown in FIG. 11 is less than the distance to generate the main scanning line shown in FIG. 17.

Referring to FIG. 20, it is assumed that a dotted W-shaped line indicates a main scanning line when the amount that a pressure unit deforms a reflection mirror in the direction opposite the direction of the forcible curve, that is, the amount (distance) that the pressure unit pushes to move a center portion of the reflection mirror, is indicated by arrow F1 in a comparative optical writing unit. A main scanning line Ld indicated by a solid line is obtained when the amount that the pressure unit deforms the center portion of the reflection mirror is reduced from the amount indicated by arrow F1, which causes the main scanning line indicated by the dotted line, to the amount indicated by arrow F2. As shown in FIG. 20, the main scanning line Ld curves toward upstream in the direction indicated by arrow B3 in which the surface of the photoreceptor moves, compared to the main scanning line indicated by the dotted line.

Figure 21:
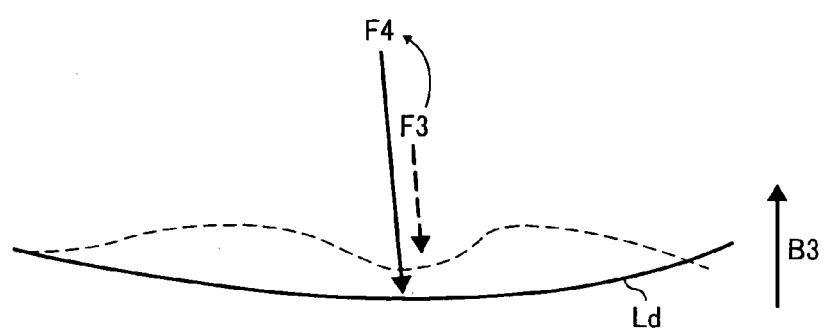
FIG. 21 illustrates a main scanning line when the distance the pressure unit pushes the center portion of the reflection mirror shown in FIG. 11 is greater than the distance to generate the main scanning line shown in FIG. 18.

By contrast, referring to FIG. 21, it is assumed that a dotted M-shaped line indicates a main scanning line when the amount that the pressure unit deforms the center portion of the reflection mirror is indicated by arrow F3. A main scanning line Ld indicated by a solid line shows a main scanning line when that is an amount indicated by arrow F4. The amount that the pressure unit pushes to deform the center portion of the reflection mirror in a direction opposite the direction of the forcible curve is increased in a case of the main scanning line Ld from a case of the dotted M-shaped main scanning line.

As shown in FIG. 21, when the amount of the deformation of the curvature correction mirror in the direction opposite the direction of the forcible curve is thus increased, the main scanning line Ld curves toward upstream in the direction indicated by arrow B3 similarly to that shown in FIG. 20, compared to the M-shaped main scanning line indicated by the dotted line.

As is clear when FIGS. 20 and 21 are compared, the main scanning lines Ld shown in FIGS. 20 and 21 curve in a similar direction and amount. That is, even if the direction of the initial curvature of the main scanning line caused by the holder structure is different among the multiple reflection optical systems, the color deviation in multicolor images can be reduced.

In view of the foregoing, an optical writing unit according to another variation of the present embodiment is described below. It is to be noted that, unless otherwise specified, the optical writing unit described below has a configuration similar to that of the optical writing unit 4 shown in FIG. 4.

In the present variation, the curvature adjustment unit and the inclination adjustment unit are provided on the third reflection mirror 46 in all the four reflection optical systems shown in FIG. 4. Further, the third reflection mirrors 46Y, 46C, 46M, and 46K that are being pushed by the curvature adjustment unit curve in such a manner as to curve the main scanning lines on the photoreceptors 10Y, 10C, 10M, and 10K in a similar direction and amount.

In the configuration described above, as shown in FIGS. 20 and 21, the main scanning lines on the respective photoreceptors can have a similar shape and be substantially consistent relatively, and thus the color deviation in multicolor images can be reduced.

Further, unlike the optical writing unit 4 shown in FIG. 4, even if the direction of the curve of the main scanning line on the photoreceptor caused by the forcible curve of the curvature correction mirror is similar in the respective reflection optical systems, the color deviation in multicolor images can be reduced. That is, because it is not necessary to specify the alignment order of the reflection mirror to which the curvature adjustment unit is provided among multiple reflection mirrors, arrangement of components of the optical writing unit can be more freely determined.

Numerous additional modifications and variations are possible in light of the above teachings. It is therefore to be understood that, within the scope of the appended claims, the disclosure of this patent specification may be practiced otherwise than as specifically described herein.

What is claimed is:

1. An optical scanner to scan a plurality of objects respectively with optical beams emitted from an optical beam emitter, the optical scanner comprising:
a deflector assembly including at least one deflecting unit configured to deflect the optical beams in a main scanning direction; and
a plurality of reflection optical systems each including,
a plurality of reflection mirrors configured to reflect one of the optical beams, and
a curvature adjustment unit including a holder structure configured to forcibly curve one of the plurality of reflection mirrors in a direction opposite the main scanning direction and a pressure unit configured to push the reflection mirror in a direction opposite the direction of the forcible curve,
wherein the curvature adjustment unit adjusts a direction and an amount of curvature of a main scanning line on the object by adjusting an amount that the pressure unit deforms the reflection mirror, and
a direction of a curve of the main scanning line on the object caused by the forcible curve of the reflection mirror formed by the holder structure is similar in the plurality of objects.

2. The optical scanner according to claim 1, wherein at least one of the plurality of reflection optical systems is provided upstream of the deflector in a sub scanning direction, and remaining reflection optical systems are provided downstream of the deflector in the sub scanning direction.

3. The optical scanner according to claim 2, wherein each of the plurality of reflection optical systems includes an identical number of reflection mirrors, and an alignment order of the reflection mirror to which the curvature adjustment unit is attached in a direction in which the optical beam travels is one of an odd number and an even number in the reflection optical systems provided upstream of the deflector in the sub scanning direction and the other of the odd number and the even number in the reflection optical systems provided downstream of the deflector in the sub scanning direction.

4. The optical scanner according to claim 1, wherein the deflector assembly comprises a plurality of the deflecting units,
the plurality of reflection optical systems are divided into a plurality of reflection-deflection groups each provided with one of the deflecting units, and
relative position of the deflector and each of the reflection optical systems in a sub scanning direction is similar in all of the reflection-deflection groups.

5. The optical scanner according to claim 1, wherein the pressure unit deforms the reflection mirror in each of the plurality of reflection optical systems to cause the main scanning lines on the objects to curve in a similar direction.

6. The optical scanner according to claim 1, further comprising an inclination adjuster attached to one of the plurality of reflection mirrors, configured to adjust an inclination of the reflection mirror.

7. An optical scanner to scan a plurality of objects respectively with optical beams emitted from an optical beam emitter,
the optical scanner comprising:
a deflector assembly including at least one deflecting unit configured to respectively deflect the optical beams in a main scanning direction; and
a plurality of reflection optical systems each including,
a plurality of reflection mirrors to reflect one of the optical beams, and
an even number of curvature adjustment units each including a holder structure configured to forcibly curve one of the plurality of reflection mirrors in a direction opposite the main scanning direction and a pressure unit configured to push the reflection mirror in a direction opposite the direction of the forcible curve,
wherein the curvature adjustment unit adjusts a direction and an amount of curvature of a main scanning line on the object by adjusting an amount that the pressure unit deforms the reflection mirror, and
in each of the reflection optical systems, a first half of the curvature adjustment units and a second half thereof curve the main scanning line in directions opposite to each other by respectively curving the reflection mirrors forcibly with the holder structures.

8. The optical scanner according to claim 7, wherein, in each of the reflection optical systems, the first half of the curvature adjustment units are respectively provided on the reflection mirrors whose alignment order in a direction in which the optical beam travels are odd, and the second half of the curvature adjustment units are respectively provided on the reflection mirrors whose alignment order in the direction in which the optical beam travels is even.

9. The optical scanner according to claim 7, wherein each of the pressure unit deforms the reflection mirror in each of the plurality of reflection optical systems to cause the main scanning lines on the objects to curve in a similar direction.

10. The optical scanner according to claim 7, further comprising an inclination adjuster attached to one of the reflection mirrors, configured to adjust an inclination of the reflection mirror.

11. An image forming apparatus comprising:
a plurality of image carriers;
an optical scanner configured to form electrostatic latent images on the plurality of image carriers through optical scanning, respectively, comprising a deflector assembly including at least one deflecting unit configured to respectively deflect the optical beams in a main scanning direction and a plurality of reflection optical systems;
a plurality of developing units each configured to develop the electrostatic latent image formed on one of the image carriers; and
a plurality of transferers each configured to transfer the developed image on one of the image carriers to a transfer member,
wherein each of the reflection optical systems includes a plurality of reflection mirrors to reflect one of the optical beams and an even number of curvature adjustment units each including a holder structure configured to forcibly curve one of the plurality of reflection mirrors in a direction opposite the main scanning direction and a pressure unit configured to push the reflection mirror in a direction opposite the direction of the forcible curve,
each of the curvature adjustment units adjusts a direction and an amount of curvature of a main scanning line on the image carrier by adjusting an amount that the pressure unit deforms the reflection mirror, and
in each of the reflection optical systems, a first half of the even number of curvature adjustment units and a second half of the curvature adjustment units curve the main scanning line in directions opposite to each other by respectively curving the reflection mirrors forcibly with the holder structures.

* * * * *